Oct. 22, 1929.  O. S. HERSHEY  1,732,749
AUTOMOBILE LOCK
Filed May 4, 1925   3 Sheets-Sheet 1
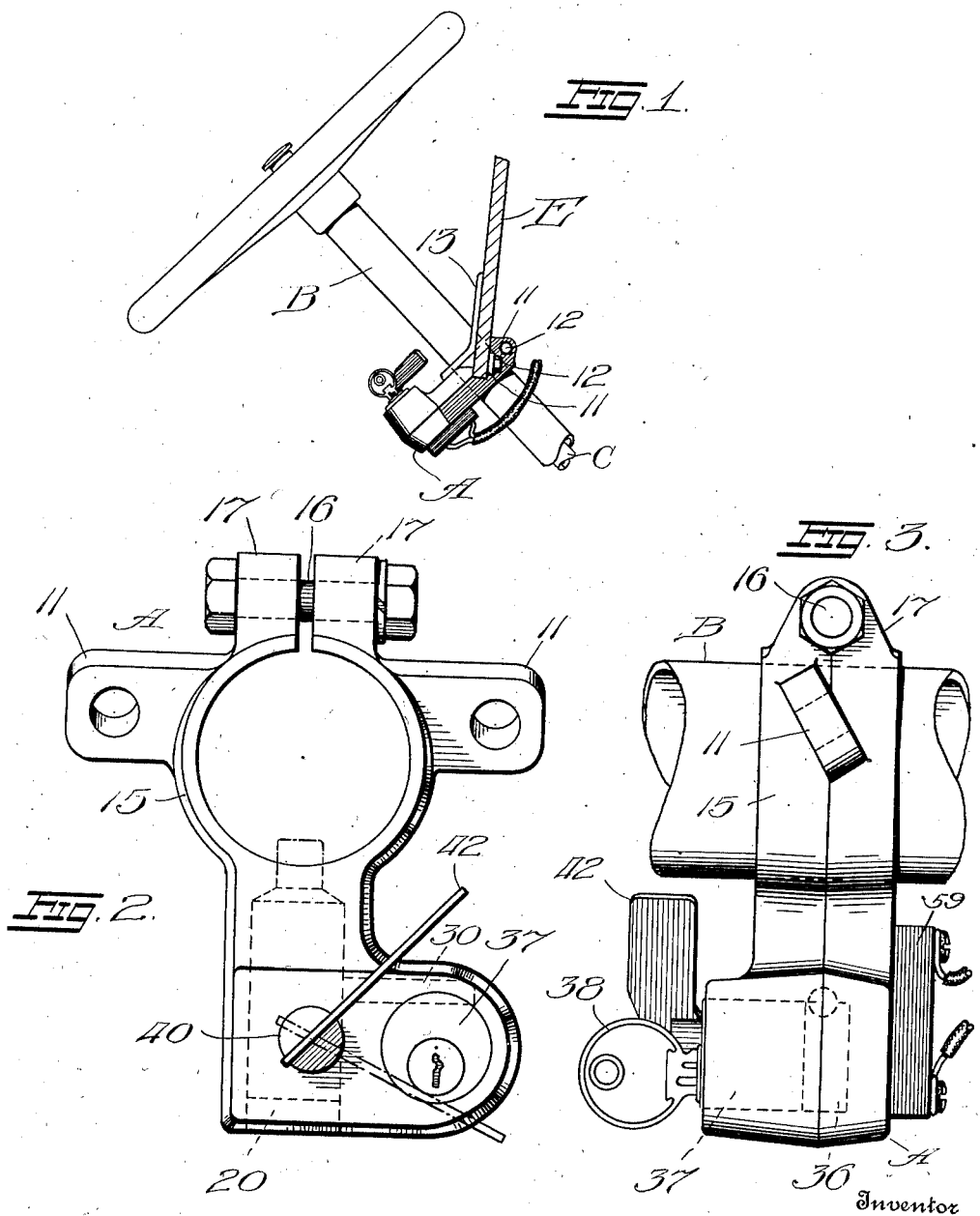
Inventor
ORVILLE S. HERSHEY
By
Attorneys

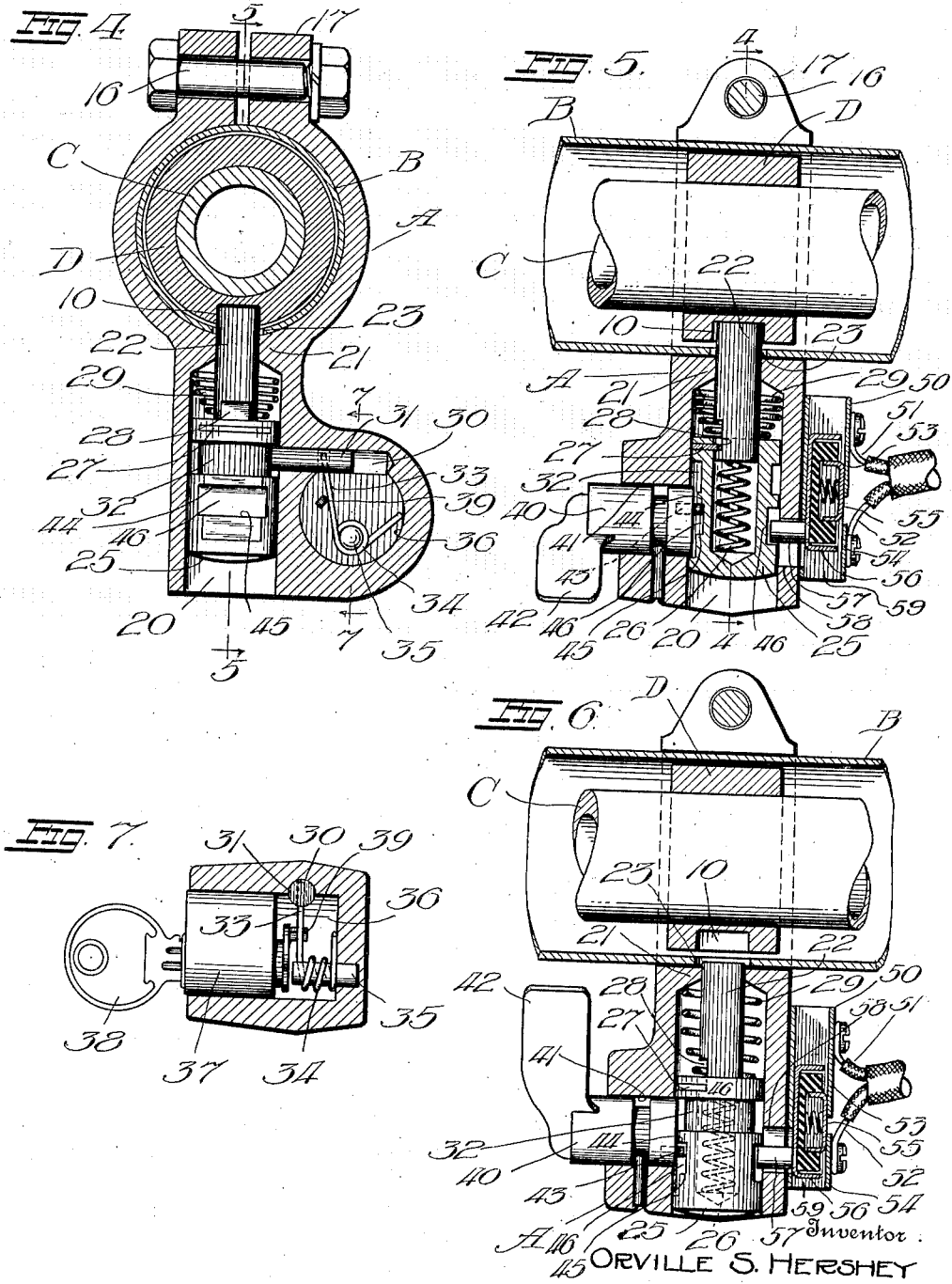

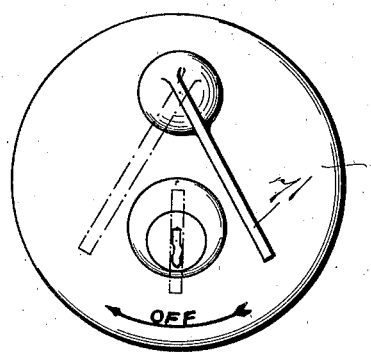
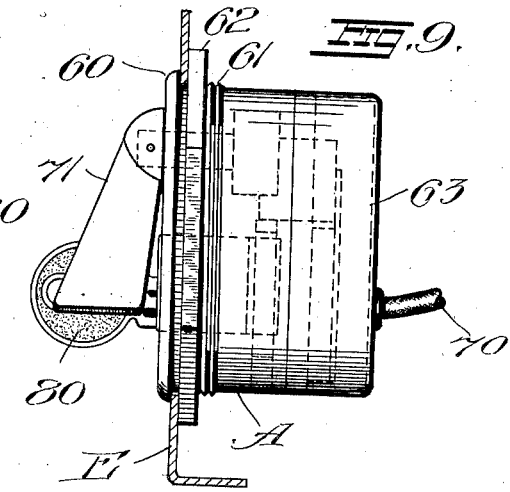
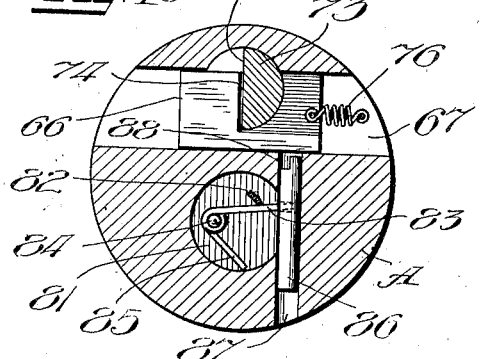
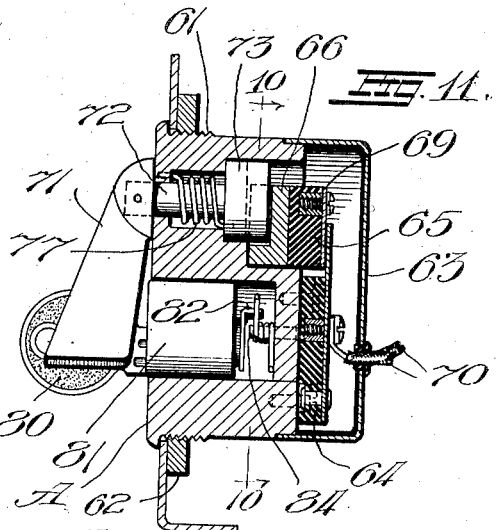
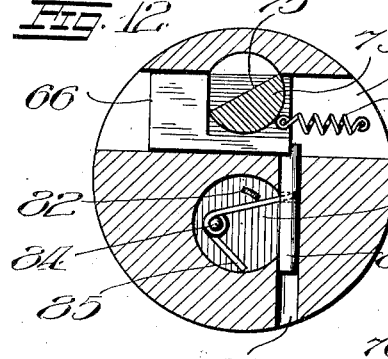
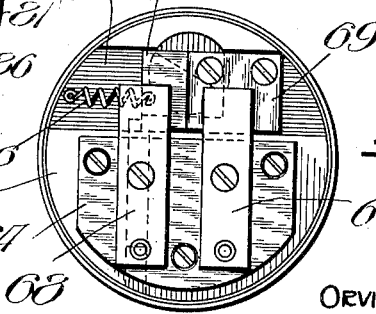

Patented Oct. 22, 1929

1,732,749

UNITED STATES PATENT OFFICE

ORVILLE S. HERSHEY, OF CHICAGO, ILLINOIS, ASSIGNOR TO HERSHEY MANUFACTURING COMPANY, OF CHICAGO, ILLINOIS, A CORPORATION OF COLORADO

AUTOMOBILE LOCK

Application filed May 4, 1925. Serial No. 27,660.

This invention relates to certain improvements in automobile locks, and more particularly to locks of that type which utilize a double control means, one operated by a movable manipulative device which is a fixed part of the mechanism, and the other by a removable key. Such a lock may be associated with any vital part of the automobile whereby to prevent its operation, unless the proper key be applied to manipulate one of the control means. It may be associated with the steering mechanism, the gear transmission, the motor ignition circuit, or elsewhere, to obtain results of the kind noted.

As an example of two specific manners of use, the description to follow, as well as the drawings, will treat my invention as applicable to a steering mechanism, and also to a motor ignition circuit, the latter either alone, or combined with a steering lock so as to be operated concurrently therewith. A lock of this general character is desirably mounted upon a fixed part of the vehicle, and preferably should be readily accessible so as to be convenient for use. With these and various other objects in view which will hereinafter appear, my invention consists of certain parts which are constructed and arranged in accordance with the exemplifications shown in the accompanying drawings, in the manner following:

Figure 1 is a vertical section through an automobile dash or instrument board showing in side elevation a steering column bracketed thereto by means of a housing wherein is contained the lock of my invention;

Fig. 2 is an enlarged plan view of the lock housing;

Fig. 3 is a side elevation thereof;

Fig. 4, which is a sectional view taken on line 4—4 of Fig. 5, shows the lock in operative relation to the steering column;

Fig. 5 is a vertical section therethrough, taken on line 5—5 of Fig. 4;

Fig. 6, which is a view similar to Fig. 5, shows the locking bolt retracted whereby both the steering mechanism and ignition circuit are rendered operative;

Fig. 7, which is a sectional detail taken on line 7—7 of Fig. 4, shows the lock cylinder and associated parts;

Fig. 8 is a view in elevation of the face plate and control parts thereon which may be employed with a lock for the motor ignition circuit only;

Fig. 9 is a side elevation thereof;

Fig. 10 is a transverse section therethrough, taken on line 10—10 of Fig. 11, showing the parts as related when the switch is closed;

Fig. 11 is a central longitudinal section therethrough;

Fig. 12 is a view similar to Fig. 10, showing the parts moved to open the switch; and Fig. 13 is a rear elevation of the switch, the protecting cap therefor being removed from the view.

Referring now to the construction shown in Figs. 1 to 7 inclusive, the lock is represented as contained within a casing A adapted for mounting upon an automobile column B which surrounds in spaced relation a steering post C. Secured fast to the post in the region of the lock is a collar D (see Figs. 4 and 5) having a groove or notch 10. Since the collar is associated with the post primarily for constructional reasons, and is to all intents and purposes a part thereof, it will be so treated in the description and claims to follow.

As shown, the present lock is designed also for connection with a fixed part of the automobile, such as its dash or instrument board E. A pair of apertured lugs 11 extending laterally from opposite sides of the housing are adapted to receive bolts 12 which pass through the dash board. In this manner the lock housing may be secured in place. If desired, a shield plate 13 (see Fig. 1) may be applied to the front face of the dash and over a portion of the upper face of the lock housing, to improve the appearance and prevent tampering with the proximate bolt ends.

The lock housing in the form shown includes a split collar 15 adapted for close fitting around the steering column. As by means of a bolt 16 which passes through a pair of lugs 17 extending outwardly from the collar adjacent the free ends thereof, the collar may be tightly clamped upon the column so as to be locked against rotation relative thereto. This part of the housing to which objection might be made on the ground that it is unsightly, is at all times concealed from view behind the instrument board (see Fig. 1).

The body of the lock housing is formed to provide certain cylindrical passages for the reception of the operating parts which will now be explained. One of these passages 20 is extended through the housing in a direction which is radial to the steering column, being constricted adjacent the column by inwardly extending walls 21. Within this passage is accommodated a locking bolt 22 adapted to be projected into the collar groove 10 so as to interfere with the steering operations. At the point where the constricted end of the passage 20 opens onto the inner face of the collar, a second opening 23 in register therewith is provided in the column, and it is through this latter opening that the locking bolt is projected into engagement with the collar.

In the form shown, the bolt is associated with certain other parts including a hollow plunger 25 slidably fitted within the passage 20, the bolt 22 being itself slidable within the plunger. Rearwardly of the bolt is a compression spring 26 which bears also against the outer plunger end, its tendency being to normally project the bolt inwardly toward the steering post. The degree of relative movement which may obtain between the bolt and plunger is determined by a stop plate 27 which is inserted through an aperture in one side of the plunger to present its inner end within a longitudinally extending slot 28 formed in the proximate bolt side. A second compression spring 29 is interposed between the plunger and the inwardly extending walls 21 at the inner passage end, the spring 29 acting to retract the plunger and bolt associated therewith, whenever conditions will permit.

Within the body of the housing are formed also other passages, one 30 which is transverse to the passage 20 and in communication therewith being adapted to accommodate a detent in the form of a pin 31 which is slidable toward and from the plunger. Formed in the outer wall of the plunger is an annular recess 32 wherein the inner end of the pin 31 may enter to restrain the plunger against longitudinal movement in either direction. The pin itself is under tension of one arm 33 of a spring 34 which may be coiled about a stem 35 anchored in a wall of the housing at the inner end of a third passage 36. In this last passage is secured a rotatable cylinder lock 37 operable only with the proper key 38. At the rear end of the lock cylinder is an eccentric lug 39 so arranged as to engage at times with the spring arm 33 for the purpose of moving the same counter to its tension. In so doing the pin 31 is retracted from engagement with the plunger 25, thereby restoring freedom of movement to this latter element. The lock cylinder passage 36 intersects the passage 30 wherein the pin 31 is mounted, and by this relationship the several components of the operative connections may be installed and operated with greater facility.

As part of the present lock, I provide a manipulating means by which movements of the locking bolt are controlled. This part of my invention includes a shaft 40 mounted for rotation within a passage 41 which extends through the walls of the housing to communicate with the main passage 20. The shaft 40, which may be pinned or otherwise held against displacement, is provided with an operating handle 42 which is required to swing in a path which crosses the key 38. At the end of this shaft is an eccentric pin 43 projecting into the passage 20 and in operative relation to two shoulders 44 and 45 at opposite ends of a recess 46 which is formed on the plunger 25. By rotating this eccentric pin shaft, the plunger, together with the locking bolt, may be moved toward the steering post, the return movement of the plunger and bolt being effected by the spring 29 after the locking pin 31 has been fully retracted.

Upon one side of the housing, preferably the rear or under side thereof, is mounted a case or shell 50 containing the ignition switch. As shown, circuit wires 51 and 52 are connected to fixed contacts in the form of spaced plates 53 and 54 respectively, a connecting conductor element 55 being slidably interposed therebetween. This conducting element is spring mounted on a block 56 slidably arranged between guides 59 which are positioned in the case. The block is equipped with a pin 57 which extends through a slotted opening 58 in the lock housing wall. The inner end of this pin lies within the slot 46 of the plunger whereby the pin itself may be moved when engaged by the shoulders 44 and 45. When this takes place, the conductor block will also be shifted with the result that the switch is opened or closed according as the steering mechanism is disabled or rendered operative. I would have it noted that the pin 57 is moved in response to alternate engagement of the two shoulders 44 and 45. These shoulders are so spaced that movement of the plunger will always precede, by a definite distance, any operation on the part of the switch. It is desirable that the recess 46 be of substantially the same length as the working stroke of the plunger, also that the pin 57 be properly co-related thereto, so that opening of the switch will take place only when the pin 31 has advanced, or is free to do so; and, conversely, on the return stroke, that the locking bolt be retracted clear of the steering post before the switch is again closed. This coincidental operation results from having the switch movement lag behind that of the plunger, and associated locking bolt, a distance sufficient to accomplish the result described. Such a delayed movement is advantageous in that the switch cannot be opened by a part-way movement of the locking bolt which would then be free to retract again whereby to close the switch; nor, after the bolt has been advanced to locking position, may the switch be closed again until the bolt has been withdrawn clear of the steering post.

As to the operation of the present lock, it will be noted that the pin 31 must be retracted preliminary to any disengagement of the locking bolt from the steering post, and consequently the operator must have the proper key 38 for rotating the cylinder lock. The moment that this pin is retracted from engagement with the plunger, the spring 29 is effective to push back the plunger. With the plunger moved back ever so slightly, the locking pin 31 is unable to interfere with complete retraction of the locking bolt, which is assured by the action of the spring 29. This restoration of the plunger to the normal operating position of Fig. 6 is accompanied by a shift of the block which carries the conductor plate. It follows, therefore, that there is a co-incidental closing of the ignition circuit so that the motor, as well as the steering apparatus, may be operated.

To disable both the steering apparatus and the motor requires merely a reversal of the steps just described. If the key be left in the cylinder lock, as would be natural during periods of automobile operation, the handle 42 is incapable of executing an operative swing necessary for advancing the plunger and locking bolt toward the steering post. In other words, the continued presence of the key in the cylinder lock will prevent any accidental disablement of either the motor or the steering apparatus, while the automobile remains in condition for operation. It is only when the key is withdrawn from the cylinder lock that this operating handle 42 may be swung through its operative arc, and that the motor may be stopped and the steering apparatus disabled.

Another form of mechanism answering generally to the preceding description may, as already suggested, be interposed in the motor ignition circuit and operate with independence of any steering lock. An example of such a construction is shown in Figs. 8 to 13 inclusive. In these views the lock is contained within a generally cylindrical housing A which is adapted for mounting upon an instrument board E, or elsewhere, as desired. As shown, it is provided with a face plate 60 of slightly larger diameter than the housing, the face plate being adapted to rest upon the front face of the instrument board. A suitable opening is provided in the board for the reception of the housing upon which are screw threads 61 for receiving a collar 62 which may be turned up to engage with the rear face of the instrument board. In some such manner as this, the lock may be mounted in place.

At the rear end of the housing is secured a cap 63. To the inner side of the cap is a space wherein may be accommodated certain parts which constitute a switch for the ignition circuit. As shown, these comprise two insulated blocks 64 and 65, the former being fixedly secured to the rear side of the housing. The latter is carried upon a block 66 which is slidably mounted within a slot 67 extending transversely of the housing. Two brushes 68 are supported on the block 64, each having one end projected to overlie the movable block 65 on which is carried a conductor plate 69. This plate is so proportioned and located as to extend between the projecting ends of the two brushes 68 when the block 66 is in one position, and to slide away from contact with one of these brushes when the block is moved to another position. Circuit wires 70 are extended through an opening in the cap to connect with the two brushes in any well known manner.

The movements of the block 66 are controlled by a manipulative handle 71 which is fixed to a shaft 72 having at its inner end a cam 73 which is adapted to engage with an upstanding shoulder 74 on the block 66. As shown, this cam has a flat side 75 which is adapted to engage with the shoulder when the block is moved to a central position where contact is made with both brushes 68. Normally the block remains in this position, due to the presence of a pull spring 76 which connects with one end thereof and with a fixed part of the housing. If the handle 71 be rotated so that the cam assumes a different relation to the shoulder 74, the block will be shifted laterally against the tension of the spring, to the position shown in Fig. 12, with the result that the plate 69 breaks contact with one of the brushes 68. The switch is open when the parts are in this position. It is preferred that these movements of the control means 71 should be subject to the influence of a second spring 77 which, as shown, is coiled around the shaft 72 with one end anchored to the housing and the other to the cam 73. The effect of this torsion spring is to rotate the shaft and cam back to the normal position of Fig. 10 where the circuit is completed between the two brushes 68.

I also provide a second control means which affects the operation of the cam, the same being operated through the medium of a removable key 80. This key co-operates with a lock cylinder 81 having a finger 82 projecting eccentrically from its rear end so as to engage with one arm 83 of a wire spring which is coiled about a stud 84 in a manner to present its other free end 85 under tension adjacent a wall of the housing. The spring arm 83 is connected with a detent in the form of a pin 86 slidably mounted in a bore 87 which intersects the slot 67. The acting end of this pin is shouldered as at 88 so as to engage with a corner of the block 66 when the same is moved laterally close to its limit. The spring 83 tends to project this pin into the position of Fig. 12 so that when the block has been retracted through the control means 71 to break the circuit, it will be prevented from returning to the normal position of Fig. 10. In this manner, I provide a means which is controlled by the key 80 for preventing closing of the circuit. It is only when the proper key is introduced into the lock cylinder, and a rotative force applied thereto such as to retract the spring arm 83, that the pin 86 will disengage from the block 66 to permit closing of the switch.

Referring particularly to Figs. 8, 9, and 11, it will be noted that the control 71 is arranged with relation to the lock cylinder 81 in such a manner that it swings across the slot thereof in which the key 80 is entered. When the key is in its operating position, the control 71 is blocked from moving through the distance necessary for opening the switch. It is thus seen that the parts are so designed that removal of the key 80 is a condition precedent to operative movement of the control 71. The advantage of this is that the switch may not be open accidentally, or otherwise, as long as the key remains within the lock. This is a factor of safety designed to meet the most exacting requirements.

The present lock which embodies certain improvements over others already invented by me is advantageous also in that it permits of certain economies in manufacture. It is widely adaptable to different makes of automobiles, and is proof both against loss thereof through theft, or damage through careless operation. As already suggested, it may be profitably associated with various of the vital mechanism of the vehicle such as the steering apparatus, the motor ignition circuit, the gear transmission, or elsewhere, the result in any such case being to assure non-operativeness of the vehicle. Various details of construction as hereinbefore set forth are manifestly susceptible of embodiment in forms other than the precise ones shown, and such modifications, in so far as they fall within the purview of the claims below, are to be considered as embraced within the limits of my invention.

I claim:

1. In combination with an operating member, a lock having a bolt movable into engagement with said member to oppose movement thereof, a detent movable toward the bolt consequent upon its advance to hold the same against retraction, a switch adapted to open and close an electric circuit, and a connection between the bolt and switch adapted to impart to the latter a lag movement sufficient to produce a substantially coincidental operation of the detent and switch when the bolt is moved in one direction, substantially as described.

2. An automobile lock in which is combined a locking bolt, an electrical switch consisting of a slide block having an operative connection with the bolt, a conducting element supported on the block, and a pair of fixed contacts with which the conducting element may slidingly engage when the block is moved to one position whereby to establish an electrical circuit through the switch, substantially as described.

3. An automobile lock in which is combined a locking bolt, an electrical switch consisting of a slide block from which projects a pin toward the bolt for loose connection therewith, a pair of fixed contacts, and spring pressed conductor means carried by the block for slidingly bridging the gap between the contacts when the bolt is moved to one position, substantially as described.

4. An automobile lock in which is comprised a locking bolt, an electrical switch consisting of a slide block having an operative connection with the bolt, a conducting element spring supported on the block, and a pair of fixed contacts with which the conducting element may slidingly engage when the slide block is moved to one position, substantially as described.

5. An automobile lock in which is comprised a locking bolt, an electrical switch consisting of a slide block having an operative connection with the bolt, guides for confining the movements of the block through a definite path, a pair of fixed contacts, and a spring pressed conductor means carried on the block for slidingly bridging the gap between the contacts when the bolt is in one position, substantially as described.

6. In combination with a lock mechanism having a body within which is a reciprocable part, a switch in which is comprised a movable insulated block, means extending between the block and reciprocable lock part connecting the one loosely with the other for movements in unison, a spring contact carried by the block and exerting a force outwardly from the lock housing, a pair of fixed contacts interposed in an electrical circuit, and a mounting for said fixed contacts comprising insulated means connected with the lock body and extended along opposite sides of the movable block to form a guideway in which the same is reciprocatingly confined, the spring contact being engaged with pressure with both fixed contacts when the block is reciprocated to one position only whereby to close the electrical circuit, substantially as described.

ORVILLE S. HERSHEY.